(12) United States Patent
Kitahara et al.

(10) Patent No.: US 9,838,709 B2
(45) Date of Patent: *Dec. 5, 2017

(54) MOTION VECTOR PREDICTIVE ENCODING METHOD, MOTION VECTOR PREDICTIVE DECODING METHOD, MOVING PICTURE ENCODING APPARATUS, MOVING PICTURE DECODING APPARATUS, AND PROGRAMS THEREOF

(75) Inventors: Masaki Kitahara, Yokosuka (JP); Atsushi Shimizu, Yokosuka (JP); Mayuko Watanabe, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 735 days.

This patent is subject to a terminal disclaimer.

(21) Appl. No.: 13/576,620

(22) PCT Filed: Feb. 7, 2011

(86) PCT No.: PCT/JP2011/052501
§ 371 (c)(1),
(2), (4) Date: Aug. 1, 2012

(87) PCT Pub. No.: WO2011/099440
PCT Pub. Date: Aug. 18, 2011

(65) Prior Publication Data
US 2012/0307908 A1    Dec. 6, 2012

(30) Foreign Application Priority Data
Feb. 9, 2010    (JP) ................................ 2010-026129

(51) Int. Cl.
*H04N 19/52*    (2014.01)
*H04N 19/56*    (2014.01)
(Continued)

(52) U.S. Cl.
CPC ........... *H04N 19/521* (2014.11); *H04N 19/52* (2014.11); *H04N 19/533* (2014.11); *H04N 19/56* (2014.11)

(58) Field of Classification Search
CPC combination set(s) only.
See application file for complete search history.

(56) References Cited

U.S. PATENT DOCUMENTS

| 6,011,870 | A | 1/2000 | Jeng et al. |
| 6,370,194 | B2 | 4/2002 | Nishikawa |
(Continued)

FOREIGN PATENT DOCUMENTS

| CN | 1213253 A | 4/1999 |
| CN | 1649417 A | 8/2005 |
(Continued)

OTHER PUBLICATIONS

Decision on Grant, Russian Patent Application No. 2012133441, dated Jan. 21, 2014.
(Continued)

*Primary Examiner* — William C Vaughn, Jr.
*Assistant Examiner* — Lindsay Uhl
(74) *Attorney, Agent, or Firm* — Harness, Dickey & Pierce, P.L.C.

(57) ABSTRACT

In a moving picture encoding apparatus, a primary candidate reference motion vector-setting unit sets N primary candidate reference motion vectors. A degree of reliability calculation unit calculates the reliability of each primary candidate reference motion vector, which represents effectiveness in predicting a motion vector of a block to be decoded, using coded or decoded image information. A reference motion vector determination unit selects M (M<N) secondary candidate reference motion vectors in accordance with degree of reliability from among the N primary candidate reference
(Continued)

motion vectors. A motion vector prediction unit creates a predictive motion vector of a block to be coded using M secondary candidate reference motion vectors with high reliability.

14 Claims, 11 Drawing Sheets

(51) Int. Cl.
*H04N 19/513* (2014.01)
*H04N 19/533* (2014.01)

(56) References Cited

U.S. PATENT DOCUMENTS

| | | | |
|---|---|---|---|
| 6,404,815 B1 | 6/2002 | Sekiguchi et al. | |
| 7,336,707 B2 | 2/2008 | Kim | |
| 8,699,562 B2* | 4/2014 | Park et al. | 375/240 |
| 2004/0190624 A1* | 9/2004 | Kondo | H04N 7/0112 375/240.16 |
| 2004/0233990 A1 | 11/2004 | Sekiguchi et al. | |
| 2006/0098886 A1* | 5/2006 | De Haan | H04N 19/56 382/253 |
| 2006/0153300 A1 | 7/2006 | Wang et al. | |
| 2007/0071107 A1 | 3/2007 | Ha | |
| 2007/0189396 A1 | 8/2007 | Kitahara et al. | |
| 2008/0080617 A1 | 4/2008 | Kodama | |
| 2009/0052534 A1 | 2/2009 | Wang et al. | |
| 2009/0147855 A1* | 6/2009 | Song | H04N 19/105 375/240.16 |
| 2009/0148058 A1* | 6/2009 | Dane | H04N 5/145 382/251 |
| 2009/0154560 A1 | 6/2009 | Hong et al. | |
| 2009/0207315 A1* | 8/2009 | Ikeda et al. | 348/699 |
| 2009/0220005 A1 | 9/2009 | Kim et al. | |
| 2009/0304084 A1 | 12/2009 | Hallapuro et al. | |
| 2010/0014589 A1 | 1/2010 | Kondo et al. | |
| 2010/0111184 A1 | 5/2010 | Shimizu et al. | |
| 2011/0103485 A1 | 5/2011 | Sato et al. | |
| 2011/0170601 A1 | 7/2011 | Kim et al. | |
| 2012/0294371 A1* | 11/2012 | Kitahara et al. | 375/240.16 |
| 2012/0294372 A1* | 11/2012 | Kitahara et al. | 375/240.16 |
| 2012/0320985 A1* | 12/2012 | Kitahara et al. | 375/240.16 |

FOREIGN PATENT DOCUMENTS

| | | | |
|---|---|---|---|
| CN | 1832575 A | 9/2006 | |
| CN | 102823249 A | 12/2012 | |
| EP | 2 101 504 A2 | 9/2009 | |
| JP | 2003-224854 A | 8/2003 | |
| JP | 2008-171247 A | 7/2008 | |
| JP | 2008-283490 A | 11/2008 | |
| KR | EP 2101504 A2 * | 9/2009 | H04N 19/52 |
| RU | 2 189 120 C2 | 9/2002 | |
| RU | 2 209 527 C2 | 7/2003 | |
| RU | 2 251 820 C2 | 5/2005 | |
| RU | 2 298 886 C2 | 5/2007 | |
| RU | 2 314 656 C2 | 1/2008 | |
| RU | 2 338 332 C2 | 11/2008 | |
| RU | 2 377 735 C2 | 12/2009 | |
| TW | 200402662 A | 2/2004 | |
| TW | I297134 B | 5/2008 | |
| TW | 200845764 A | 11/2008 | |
| TW | 200904194 A | 1/2009 | |
| TW | 200905030 A | 2/2009 | |
| TW | 200948093 A1 | 11/2009 | |
| WO | 2009/157674 A2 | 12/2009 | |
| WO | 2010/001917 A1 | 1/2010 | |

OTHER PUBLICATIONS

Decision on Grant, Russian Patent Application No. 2012133447, dated Jan. 23, 2014.
Decision on Grant, Russian Patent Application No. 2012133449, dated Jan. 23, 2014.
Office Action, Taiwanese Patent Application No. 100104091, dated Feb. 27, 2014.
First Office Action, Chinese Patent Application No. 201180008465.6, dated Jun. 16, 2014.
Office Action, Taiwanese Patent Application No. 100104094, dated Aug. 4, 2014.
Examination Report from the Intellectual Property Office, Taiwanese Patent Application No. 100104087, dated Sep. 16, 2013.
Office Action, Chinese Patent Application No. 201180008467.5, dated Sep. 29, 2014.
Office Action, Chinese Patent Application No. 201180008468.X, dated Oct. 23, 2014.
Search Report, European Patent Application No. 11742184.2, dated May 8, 2014.
Search Report, European Patent Application No. 11742212.1, dated May 8, 2014.
Examination Report from the Intellectual Property Office, Taiwanese Patent Application No. 100104093, dated Jul. 31, 2013.
Kadono, Kikuchi, and Suzuki, "3rd revised edition. H. 264/AVC textbook", published by Impress R&D, 2009, pp. 123-125.
T. Yamamoto, "A new scheme for motion vector predictor encoding", ITU-T SG16/Q6, $32^{nd}$ VCEG Meeting, San Jose, Apr. 2007.
Kobayashi, Suzuki, Boon, and Horikoshi, "Reduction of Predictive Information Amount with Motion Prediction Method Using Template Matching", The Proceedings of Picture Coding Symposium of Japan, 2005, pp. 17-18.
Lidong Xu, Xinggang Lin, "Digital Image Stabilization Based on Circular Block Matching", IEEE Transactions on Consumer Electronics, vol. 52, No. 2, May 2006.
International Search Report (English and Japanese) and Written Opinion of the ISA (Japanese) for PCT/JP2011/052501, ISA/JP, dated Mar. 8, 2011.
International Search Report (English and Japanese) for PCT/JP2011/052603, ISA/JP, dated Mar. 8, 2011.
International Search Report (English and Japanese) for PCT/JP2011/052361, ISA/JP, dated Mar. 8, 2011.
International Search Report (English and Japanese) for PCT/JP2011/052592, ISA/JP, dated Mar. 8, 2011.
Office Action, Canadian Patent Application No. 2,788,952, dated Aug. 26, 2015.
Laroche, Guillaume, et al., "RD Optimized Coding for Motion Vector Predictor Selection," IEEE Transactions on Circuits and Systems for Video Technology, vol. 18, No. 9, Sep. 2008, pp. 1247-1257.
Extended European Search Report, Patent Application No. 11742207.1, dated May 27, 2015.

* cited by examiner

MOTION VECTOR PREDICTIVE ENCODING METHOD, MOTION VECTOR PREDICTIVE DECODING METHOD, MOVING PICTURE ENCODING APPARATUS, MOVING PICTURE DECODING APPARATUS, AND PROGRAMS THEREOF

CROSS-REFERENCE TO RELATED APPLICATIONS

This application is a 371 U.S. National Stage of International Application No. PCT/JP2011/052501, filed Feb. 7, 2011. This application claims priority to Japanese Patent Application No. 2010-026129, filed Feb. 9, 2010. The disclosures of the above applications are incorporated herein by reference.

TECHNICAL FIELD

The present invention relates to moving picture encoding technology for performing predictive encoding of a motion vector. More particularly, the present invention relates to a motion vector predictive encoding method, a motion vector predictive decoding method, a moving picture encoding apparatus, a moving picture decoding apparatus, and programs thereof which improves the efficiency of motion vector prediction and improves the efficiency of moving picture encoding.

Priority is claimed on Japanese Patent Application No. 2010-026129, filed Feb. 9, 2010, the contents of which are incorporated herein by reference.

BACKGROUND ART

In a moving picture encoding scheme using motion compensation as exemplified by H.264, predictive encoding of a motion vector is performed in order to efficiently encode the motion vector.

FIG. 10 illustrates an example of a configuration of a motion compensation unit in a conventional moving picture encoding apparatus. A motion compensation unit 100 in the conventional moving picture encoding apparatus is provided with a motion search unit 101, a motion vector memory 102, a motion vector prediction unit 103, and a prediction residual calculation unit 104.

If a video signal of a block to be encoded is input, the motion search unit 101 performs a motion search by collating it with a decoded signal of an encoded reference picture, calculates a motion vector, and stores it in the motion vector memory 102. The motion vector prediction unit 103 reads motion vectors that have been used in encoding of encoded blocks around the block to be encoded from the motion vector memory 102, and calculates a predictive motion vector using them as reference motion vectors. The prediction residual calculation unit 104 calculates the residual between the motion vector calculated by the motion search unit 101 and the predictive motion vector calculated by the motion vector prediction unit 103, and outputs a motion vector prediction residual. This motion vector prediction residual is encoded and output as encoded information of the motion vector.

FIG. 11 illustrates an example of a configuration of a motion compensation unit in a conventional moving picture decoding apparatus. A motion compensation unit 200 in the conventional moving picture decoding apparatus is provided with a motion vector calculation unit 201, a predictive signal creation unit 202, a motion vector memory 203, and a motion vector prediction unit 204.

The motion vector calculation unit 201 generates a motion vector by adding a motion vector prediction residual decoded from an encoded stream to a predictive motion vector predicted by the motion vector prediction unit 204, stores this motion vector in the motion vector memory 203, and outputs it to the predictive signal creation unit 202. The predictive signal creation unit 202 reads a decoded signal from a decoded reference picture in accordance with the motion vector, and outputs it as a prediction signal of a block to be decoded. The motion vector prediction unit 204 reads motion vectors that have been used in decoding of decoded blocks around the block to be decoded from the motion vector memory 203, and calculates the predictive motion vector using them as reference motion vectors.

Technology related to the above-mentioned motion vector predictive encoding includes the following conventional technology.

(a) Median predictive encoding (H.264 and the like) [hereinafter referred to as conventional technology a]

(b) Predictive encoding based on reference motion vector designation [hereinafter referred to as conventional technology b]

FIG. 12 is a diagram for explaining an example of a conventional predictive encoding scheme of a motion vector. In the conventional technology a and the conventional technology b, when encoding a motion vector (decoding is the same), prediction is performed using motion vectors of encoded blocks (encoded motion vectors) around a block to be encoded as illustrated in FIG. 12 as reference motion vectors, and the motion vector is encoded.

Specifically, in the conventional technology a, the median of the reference motion vectors is used as a predictive motion vector, and an error (referred to as a motion vector prediction residual) between a motion vector of the block to be encoded and the predictive motion vector is encoded (refer to Non-Patent Document 1).

Moreover, in the conventional technology b, an encoding apparatus (an encoder) selects a motion vector to be used in prediction from the reference motion vectors, and encodes an identifier of a reference motion vector to be used in prediction together with a motion vector prediction residual (refer to Non-Patent Document 2).

Furthermore, conventionally, as technology for predicting the motion vector itself of the block to be encoded instead of obtaining the motion vector prediction residual and encoding the motion vector, there is technology for predicting a motion vector based on template matching (hereinafter referred to as conventional technology c). This conventional technology c is a motion vector prediction method for performing motion compensation without encoding a motion vector at an encoding side (refer to Non-Patent Document 3).

FIG. 13 is a diagram for explaining conventional motion vector prediction based on template matching. In the conventional technology c, and in the case of predicting the motion vector of the block to be encoded, by using a set (this is called a template) of encoded pixels around the block to be encoded as illustrated by a reverse L-shaped area in FIG. 13, a motion search is performed in a predetermined search range on a reference picture (this process is called template matching). Specifically, the search is performed for each motion vector in the predetermined search range by calculating the degree of similarity, such as a sum of absolute differences (SAD), between the template and an area (called a matching area) obtained by shifting an area on the reference picture in the same position as the template by the motion vector. Motion compensation is performed using the resultant motion vector. Since it is also possible for a decoding side to perform the same process with a template which is a set of decoded pixels, it is advantageous in that motion compensation is possible without encoding the motion vector.

PRIOR ART DOCUMENTS

Non-Patent Documents

Non-Patent Document 1: Kadono, Kikuchi, and Suzuki, "$3^{rd}$ revised edition. H.264/AVC textbook" published by Impress R&D, 2009, pp. 123-125.
Non-Patent Document 2: T. Yamamoto, "A new scheme for motion vector predictor encoding", ITU-T SG16/Q6, $32^{nd}$ VCEG Meeting, San Jose, April 2007.
Non-Patent Document 3: Kobayashi, Suzuki, Boon, and Horikoshi, "Reduction of Predictive Information Amount with Motion Prediction Method Using Template Matching", The Proceedings of Picture Coding Symposium of Japan, 2005, pp. 17-18.

SUMMARY OF INVENTION

Problems to be Solved by the Invention

In the above-mentioned conventional arts a and b, when there are no reference motion vectors effective for prediction in adjacent blocks, the efficiency of motion vector prediction is reduced. It is also conceivable that in addition to the vicinity of the block to be encoded, reference motion vectors of a great number of blocks included in a wider range are used in prediction. However, when this is performed using the conventional arts, the prediction efficiency and/or the encoding efficiency may be deteriorated.

FIG. 14 is a diagram for explaining the problems of the conventional arts. As illustrated in FIG. 14, when adjacent blocks of a block to be encoded are positioned at a boundary with an object Obj, when there is occlusion (when correspondence points of the adjacent blocks in a reference picture are concealed by a certain object), and/or when an object is not a rigid body, reference motion vectors of the adjacent blocks may be unsuitable for motion vector prediction of the block to be encoded, or the reference motion vectors themselves may be nonexistent because intra encoding is performed. In such a case, in both the conventional art a and the conventional art b, the prediction efficiency may be deteriorated.

In contrast, as illustrated by blocks indicated by dotted lines in FIG. 14, there may be a case in which a motion vector of a block not included in candidates is more effective for prediction. In order to use such a motion vector in prediction, it is possible to easily analogize that instead of employing only the most adjacent block as a candidate, the number of blocks to be employed as candidates is increased. However, in the case of increasing the number of blocks to be employed as candidates, with the conventional art a, an unsuitable reference motion vector may be included in candidates, and there is a risk that the prediction efficiency is deteriorated. Furthermore, with the conventional art b, since a bitrate for an identifier of a reference motion vector to be used in prediction is increased, there is a risk that the encoding efficiency is deteriorated.

On the other hand, the conventional art c is a motion vector prediction method for performing motion compensation without encoding a motion vector at an encoding side. Thus, let us consider that this is applied to the above-mentioned problems of the conventional arts. That is, let us consider that a predictive motion vector is created using the template matching of the conventional art c, a motion vector prediction residual is obtained from the predictive motion vector and a motion vector of a block to be encoded obtained through a normal motion search, and encoding is performed. In this case, the following problem may occur.

Unlike the conventional art a and the conventional art b, in the motion vector prediction in accordance with the conventional art c, it is possible to perform a search without using encoded motion vectors of adjacent blocks of a block to be encoded. For this reason, even when the encoded motion vectors are not effective for prediction, an effective predictive motion vector may be created. However, since the predictive motion vector is determined only from the template, a motion vector designating an area irrelevant to the block to be encoded may be employed as the predictive motion vector, resulting in the deterioration of the prediction efficiency.

The present invention is aimed at solving the above-described problems, and an object thereof is to improve the efficiency of motion vector prediction and improve the efficiency of moving picture encoding. Here, the efficiency of motion vector prediction represents the degree of similarity between a motion vector to be predicted and a predicted motion vector. Specifically, when the length of a difference vector of these two vectors is short, the prediction efficiency is assumed to be high.

Means for Solving the Problems

The overview of the present invention is as follows. The present invention performs motion vector prediction for respective blocks of an encoding side and a decoding side through the following method:
(1) Using a great number of (N) primary candidate reference motion vectors;
(2) Using only information already decoded when the decoding side starts decoding the block to be encoded (decoded), an evaluation value (hereinafter referred to as a degree of reliability) indicating the degree to which each primary candidate reference motion vector is suitable for prediction is obtained;
(3) The primary candidate reference motion vectors are narrowed down to M (<N) secondary candidate reference motion vectors in accordance to the degrees of the reliability; and
(4) A predictive motion vector is created using M secondary candidate reference motion vectors.

In detail, in an embodiment of the present invention, as pre-processes of motion vector prediction encoding (the following process 4), which are the same as in the conventional art, the following processes 1 to 3 are performed:
[Process 1] First, as primary candidate reference motion vectors, N (N is an integer equal to or more than 2) motion vectors, including at least one of motion vectors used in encoding already encoded blocks adjacent to a block to be encoded and motion vectors having a predetermined value, are extracted;
[Process 2] Next, the degree of reliability of each of the N primary candidate reference motion vectors, which quantitatively represents the effectiveness in predicting the motion vector of the block to be encoded, is calculated using encoded or decoded picture information;

[Process 3] Top M (M is an integer equal to or more than 1 and less than N) primary candidate reference motion vectors with higher degrees of the reliability are selected from among the N primary candidate reference motion vectors as secondary candidate reference motion vectors; and

[Process 4] A predictive motion vector of the block to be encoded is calculated using the secondary candidate reference motion vectors, and the residual between a motion vector obtained through a motion search of the block to be encoded and the predictive motion vector is encoded as encoded information of the motion vector. As a process of calculating the predictive motion vector of the block to be encoded using the secondary candidate reference motion vectors, for example, it is possible to use a conventional method for selecting the median of the M secondary candidate reference motion vectors or selecting a secondary candidate reference motion vector producing the minimum prediction residual among the M secondary candidate reference motion vectors, and encoding an identifier of the motion vector together with the prediction residual.

As described above, in the present invention, the primary candidate reference motion vectors are determined from among a great number of motion vectors within a predetermined range as well as motion vectors of blocks adjacent to the block to be encoded. Then, the degree of reliability of each of the primary candidate reference motion vectors is calculated using encoded information or decoded information. The primary candidate reference motion vectors are narrowed down in accordance with the degrees of reliability, and a narrowed-down result is used as the secondary candidate reference motion vectors. As the subsequent processes, using the secondary candidate reference motion vectors as inputs, for example, a predictive motion vector is obtained using the same method as in the conventional motion vector prediction encoding, and the prediction residual between the predictive motion vector and the motion vector is encoded.

Even in the case of the motion vector prediction decoding in accordance with the present invention, a great number of motion vectors within a range as well as motion vectors of blocks adjacent to a block to be decoded are used as primary candidate reference motion vectors. Then, the degree of reliability of each of the primary candidate reference motion vectors is calculated using decoded information. The primary candidate reference motion vectors are narrowed down in accordance with the degrees of reliability, and a narrowed-down result is used as the secondary candidate reference motion vectors. As the subsequent processes, using the secondary candidate reference motion vectors as inputs, a predictive motion vector is obtained using the same method as in the conventional motion vector prediction decoding, and the predictive motion vector is added to a decoded prediction residual to calculate a motion vector.

Advantageous Effects of the Invention

In the present invention, the processes 1 to 3 are performed so that the reference motion vectors are narrowed down. This narrowing can also be achieved on a decoding side without additional information from an encoding side, and a motion vector effective for prediction is included in secondary candidate reference motion vectors. Thus, the prediction efficiency is improved as compared with the above-mentioned conventional arts a, b, and c.

Furthermore, in general, if the efficiency of motion vector prediction is improved, entropy of a motion vector prediction residual is reduced, so that the bitrate of a motion vector becomes small. Since encoded data of a moving picture includes the bitrate of the motion vector, the encoding efficiency of the moving picture is improved as compared with the scheme using the conventional art a, b, or c.

EMBODIMENTS FOR CARRYING OUT THE INVENTION

Hereinafter, an embodiment of the present invention will be described in detail with reference to the drawings.

Figure 1:
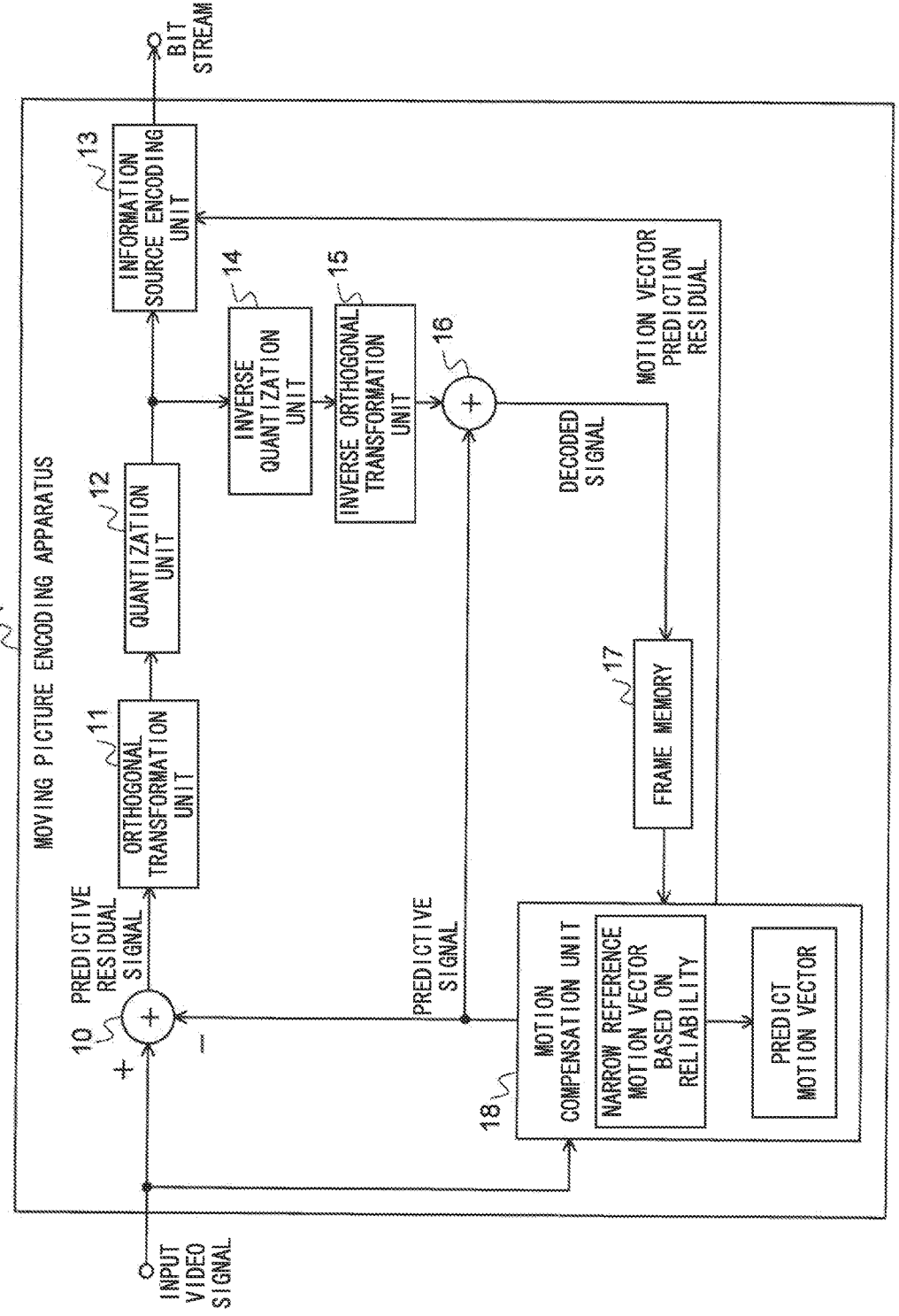
FIG. 1 is a block diagram showing a moving picture encoding apparatus according to an embodiment of the present invention.

FIG. 1 shows an example of a configuration of a moving picture encoding apparatus in accordance with an embodiment of the present invention. In a moving picture encoding apparatus 1 of the present embodiment, particularly, a motion compensation unit 18 is a part that is different from the conventional arts, and other parts are the same as a general moving picture encoding apparatus in the conventional art, which is used as an encoder in H.264 and the like.

The moving picture encoding apparatus 1 receives a video signal to be encoded, divides a frame of the received video signal into blocks, encodes each block, and outputs encoded data thereof as a bitstream.

For this encoding, a prediction residual signal calculation unit 10 obtains the difference between the received video signal and a predictive signal which is the output of the motion compensation unit 18, and outputs it as a prediction residual signal. An orthogonal transformation unit 11 performs orthogonal transformation such as discrete cosine transform (DCT) on the prediction residual signal, and outputs a transform coefficient. A quantization unit 12 quantizes the transform coefficient and outputs a quantized transform coefficient. An information source encoding unit 13 entropy-encodes the quantized transform coefficient and outputs an encoded coefficient as the bitstream.

On the other hand, the quantized transform coefficient is also input to an inverse quantization unit 14 and is inversely quantized therein. An inverse orthogonal transformation unit 15 performs inverse orthogonal transformation on a transform coefficient which is the output of the inverse quantization unit 14 and outputs a decoded prediction residual signal. A decoded signal calculation unit 16 adds the decoded prediction residual signal to the predictive signal, which is the output of the motion compensation unit 18, and generates a decoded signal of the encoded block to be encoded. This decoded signal is stored in a frame memory 17 in order to be used as a reference picture of motion compensation in the motion compensation unit 18.

The motion compensation unit 18 performs a motion search for the video signal of the block to be encoded with reference to a reference picture stored in the frame memory 17, and outputs a predictive signal of the block to be encoded. Furthermore, the motion compensation unit 18 performs motion vector prediction using encoded information in order to perform predictive encoding for a motion vector which is the result of the motion search, calculates the difference between the motion vector which is the result of the motion search and the predictive motion vector, and outputs a result to the information source encoding unit 13 as a motion vector prediction residual.

Here, at the time of predicting the motion vector, the motion compensation unit 18 uses not only motion vectors of encoded blocks around the block to be encoded. In addition, the motion compensation unit 18 sets some primary candidate reference motion vectors, and calculates the degrees of reliability of the primary candidate reference motion vectors based on encoded information. Next, the motion compensation unit 18 narrows the primary candidate reference motion vectors down to a small number of secondary candidate reference motion vectors in accordance with the degrees of reliability, and calculates a predictive motion vector using the secondary candidate reference motion vectors. A process of calculating the predictive motion vector using the secondary candidate reference motion vectors may be performed using the same motion vector prediction technique as in the conventional art.

Figure 2:
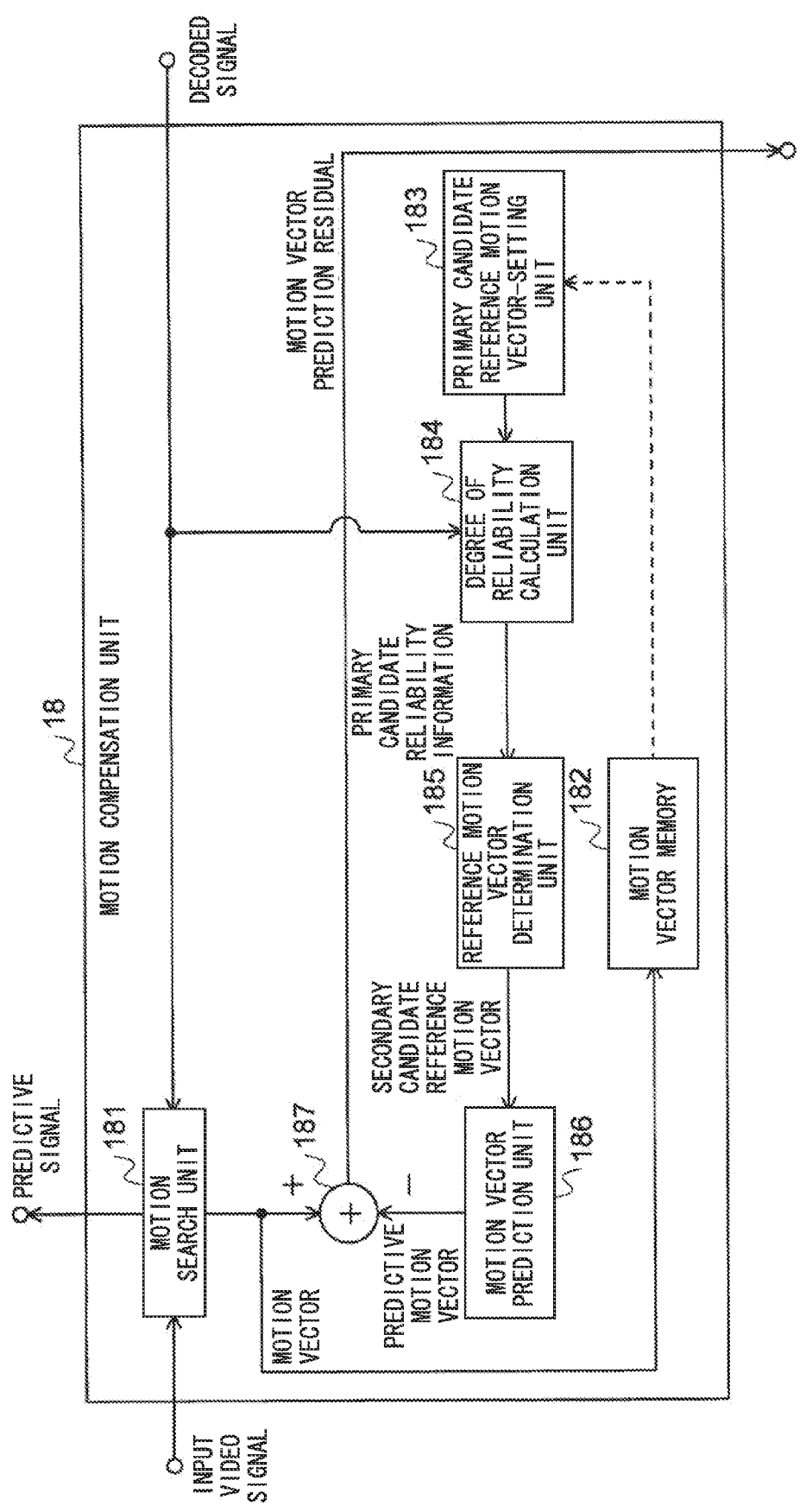
FIG. 2 is a block diagram showing a motion compensation unit shown in FIG. 1.

FIG. 2 is a diagram showing a detailed configuration example of the motion compensation unit 18 illustrated in FIG. 1. As illustrated in FIG. 2, the motion compensation unit 18 is provided with a motion search unit 181, a motion vector memory 182, a primary candidate reference motion vector-setting unit 183, a degree of reliability calculation unit 184, a reference motion vector determination unit 185, a motion vector prediction unit 186, and a motion vector prediction residual calculation unit 187.

In the motion compensation in encoding the block to be encoded, first, the motion search unit 181 performs a motion search of collating the block to be encoded of the received video signal with a decoded signal of a reference picture that has already been encoded, generates and outputs a predictive signal, and outputs a motion vector indicating a matching position. This motion vector is stored in the motion vector memory 182 and is output to the motion vector prediction residual calculation unit 187.

The primary candidate reference motion vector-setting unit 183 sets motion vectors stored in the motion vector memory 182 after being encoded in the past or N is an integer equal to or more than 2) motion vectors including motion vectors having a predetermined value as the primary candidate reference motion vectors, and notifies the degree of reliability calculation unit 184 of the primary candidate reference motion vectors.

The degree of reliability calculation unit 184 calculates the degree of reliability of each of the N primary candidate reference motion vectors, which quantitatively represents the effectiveness in predicting the motion vector of the block to be encoded, using encoded picture information (a decoded signal).

The reference motion vector determination unit 185 selects top M (M is an integer equal to or more than 1 and less than N) primary candidate reference motion vectors having higher degrees of the reliability calculated by the degree of reliability calculation unit 184 as the secondary candidate reference motion vectors.

The motion vector prediction unit 186 calculates a predictive motion vector of the block to be encoded using the secondary candidate reference motion vectors selected by the reference motion vector determination unit 185. A calculation method of the predictive motion vector in the motion vector prediction unit 186 may be the same as in the conventional art, and for example, the median of the secondary candidate reference motion vectors is employed as the predictive motion vector. Furthermore, among the secondary candidate reference motion vectors, a secondary candidate reference motion vector having a value nearest the motion vector obtained by the motion search unit 181 may be employed as the predictive motion vector, an identifier indicating the motion vector may be included in subjects to be encoded, and the subjects to be encoded may be communicated to a decoding side.

The motion vector prediction residual calculation unit 187 calculates the residual between the motion vector calculated by the motion search unit 181 and the predictive motion vector calculated by the motion vector prediction unit 186, and outputs the calculated residual as a motion vector prediction residual.

Figure 3:
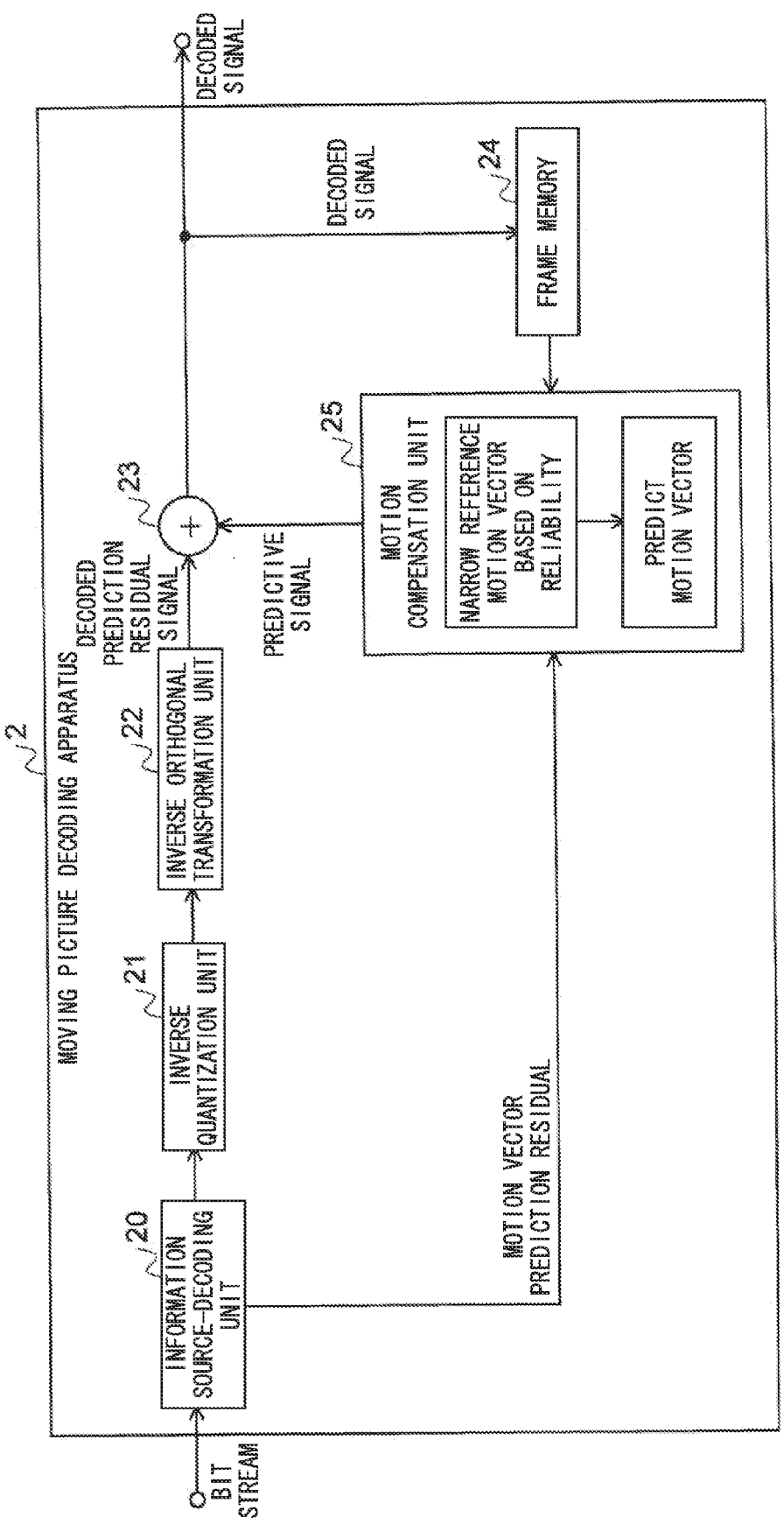
FIG. 3 is a block diagram showing a moving picture decoding apparatus according to an embodiment of the present invention.

FIG. 3 is a diagram showing an example of a configuration of a moving picture decoding apparatus in accordance with the embodiment of the present invention. In a moving picture decoding apparatus 2 of the present embodiment, particularly, a motion compensation unit 25 is a part that is different from the conventional art, and other parts are the same as a general moving picture decoding apparatus in the conventional art, which is used as a decoder in H.264 and the like.

The moving picture decoding apparatus 2 receives and decodes the bitstream encoded by the moving picture encoding apparatus 1 illustrated in FIG. 1, and outputs a decoded signal of a decoded picture.

For this decoding, based on the received bitstream, an information source-decoding unit 20 entropy-decodes a quantized transform coefficient of a block to be decoded and decodes a motion vector prediction residual. An inverse quantization unit 21 receives and inversely quantizes the quantized transform coefficient, and outputs a decoded transform coefficient. An inverse orthogonal transformation unit 22 performs inverse orthogonal transformation on the decoded transform coefficient and outputs a decoded prediction residual signal. A decoded signal calculation unit 23 adds a predictive signal generated by the motion compensation unit 25 to the decoded prediction residual signal, and generates a decoded signal of a block to be decoded. This decoded signal is output to an external apparatus such as a display apparatus, and is stored in a frame memory 24 in order to be used as a reference picture of motion compensation in the motion compensation unit 25.

The motion compensation unit 25 predicts a motion vector using decoded information stored in the frame memory 24, and adds the predictive motion vector to the motion vector prediction residual decoded by the information source-decoding unit 20 to calculate a motion vector. Next, the motion compensation unit 25 generates the predictive signal of the block to be decoded based on the motion vector with reference to a reference picture of the frame memory 24.

Here, at the time of predicting the motion vector, the motion compensation unit 25 uses not only motion vectors of decoded blocks around the block to be decoded. In addition, the motion compensation unit 25 sets a predetermined number of primary candidate reference motion vectors, and calculates the degrees of reliability of each of the primary candidate reference motion vectors from decoded information. Then, the motion compensation unit 25 narrows the primary reference motion vectors down to a small number of secondary candidate reference motion vectors in accordance with the degrees of reliability, and calculates a predictive motion vector using the secondary candidate reference motion vectors. A process of calculating the predictive motion vector using the secondary candidate reference motion vectors may be performed using the same motion vector prediction method as in the conventional art.

Figure 4:
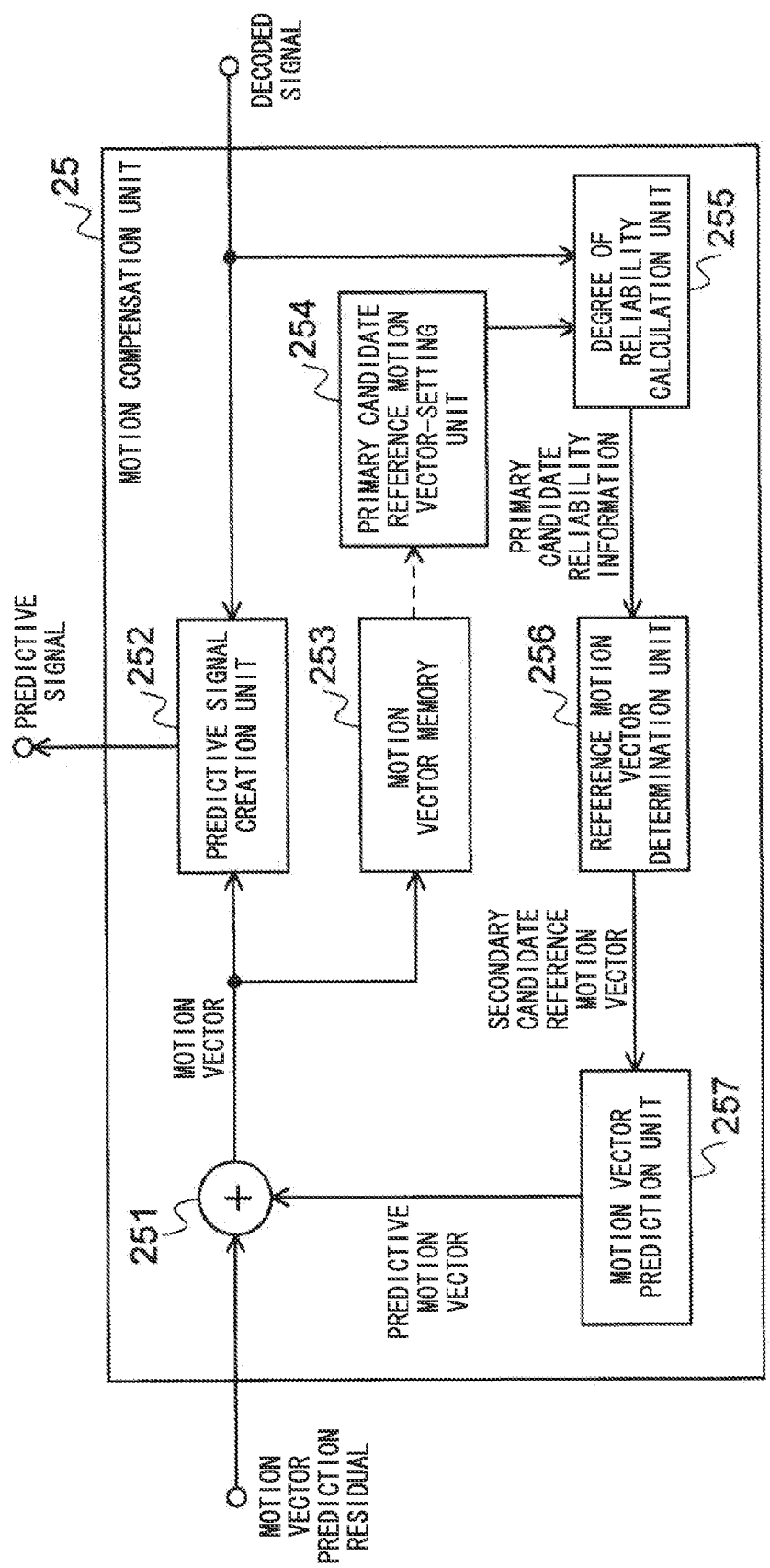
FIG. 4 is a block diagram showing a motion compensation unit shown in FIG. 3.

FIG. 4 is a diagram showing a detailed configuration example of the motion compensation unit 25 illustrated in FIG. 3. As illustrated in FIG. 4, the motion compensation unit 25 is provided with a motion vector calculation unit 251, a predictive signal creation unit 252, a motion vector memory 253, a primary candidate reference motion vector-setting unit 254, a degree of reliability calculation unit 255, a reference motion vector determination unit 256, and a motion vector prediction unit 257.

In motion compensation in decoding the block to be decoded, first, the motion vector calculation unit 251 adds a motion vector prediction residual obtained by decoding an encoded bitstream to a predictive motion vector predicted by the motion vector prediction unit 257 using decoded information, and outputs a motion vector to be used in decoding. This motion vector is stored in the motion vector memory 253 and is output to the predictive signal creation unit 252. The predictive signal creation unit 252 reads a decoded signal of a reference picture position indicated by the input motion vector, and outputs it as a predictive signal of the block to be decoded.

The primary candidate reference motion vector-setting unit 254 sets motion vectors stored in the motion vector memory 253 after being decoded in the past or N (N is an integer equal to or more than 2) motion vectors including motion vectors having a predetermined value as the primary candidate reference motion vectors, and notifies the degree of reliability calculation unit 255 of the primary candidate reference motion vectors.

The degree of reliability calculation unit 255 calculates the degree of reliability of each of the N primary candidate reference motion vectors, which quantitatively represents the effectiveness in predicting the motion vector of the block to be decoded, using decoded picture information (a decoded signal).

The reference motion vector determination unit 256 selects top M (M is an integer equal to or more than 1 and less than N) primary candidate reference motion vectors having higher degrees of the reliability calculated by the degree of reliability calculation unit 255 as the secondary candidate reference motion vectors.

The motion vector prediction unit 257 calculates a predictive motion vector of the block to be decoded using the secondary candidate reference motion vectors selected by the reference motion vector determination unit 256. A calculation method of the predictive motion vector in the motion vector prediction unit 257 may be the same as in the conventional art, and for example, the median of the secondary candidate reference motion vectors is employed as the predictive motion vector. Alternatively, when an identifier of a motion vector to be used in prediction has been designated by an encoding side, the motion vector indicated by the identifier is employed as the predictive motion vector.

Next, among the processes performed by the motion compensation unit 18 in the moving picture encoding apparatus 1 and the motion compensation unit 25 in the moving picture decoding apparatus 2, the motion vector prediction process associated with the present invention will be described with reference to FIG. 5 to FIG. 9B. Hereinafter, the motion vector prediction process of an encoding side will be mainly described; however, the motion vector prediction process of a decoding side is also the same.

Figure 5:
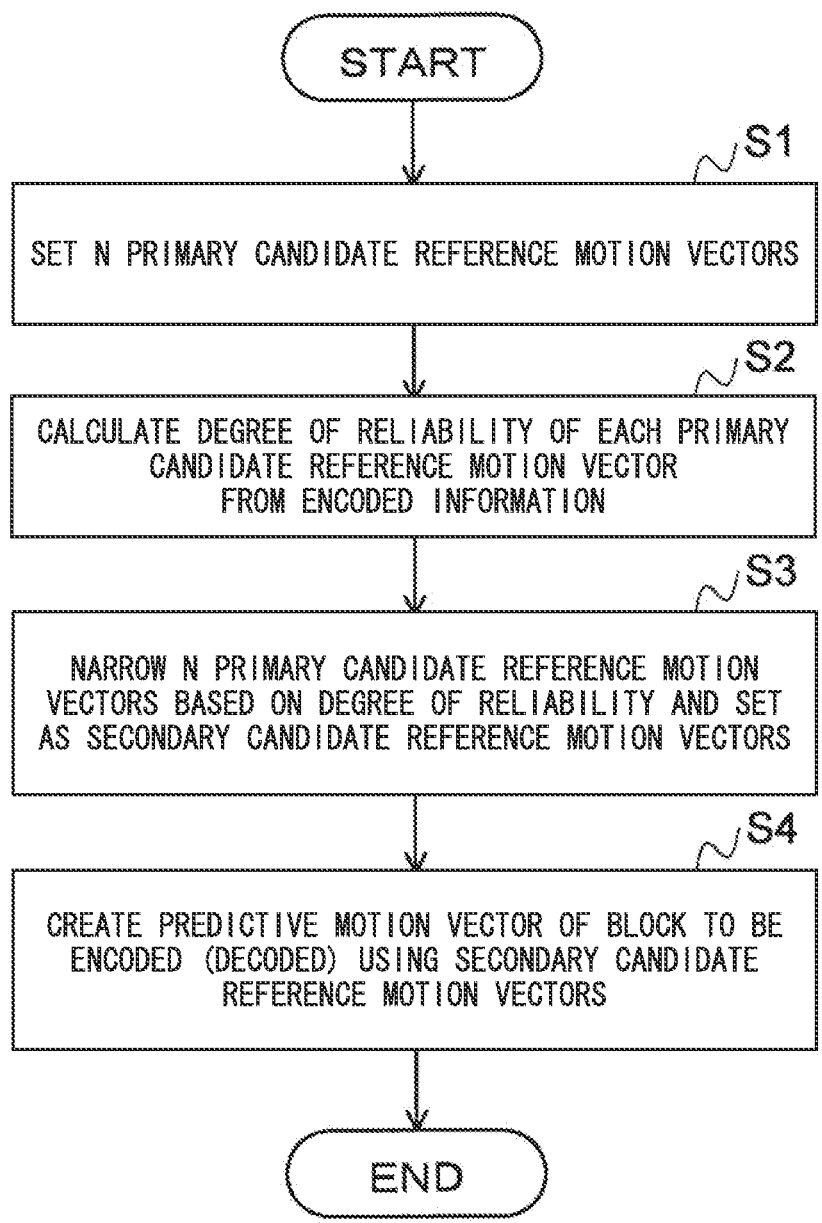
FIG. 5 is a flowchart showing a motion vector prediction process according to an embodiment of the present invention.

FIG. 5 is a flowchart of the motion vector prediction process.

[Process of Step S1]

Initially, the primary candidate reference motion vector-setting unit 183 (or 254) sets N primary candidate reference motion vectors. As a method of setting the N primary candidate reference motion vectors, for example, it is possible to use the following method.

[First Setting Example of Primary Candidate Reference Motion Vector]

Figure 6A:
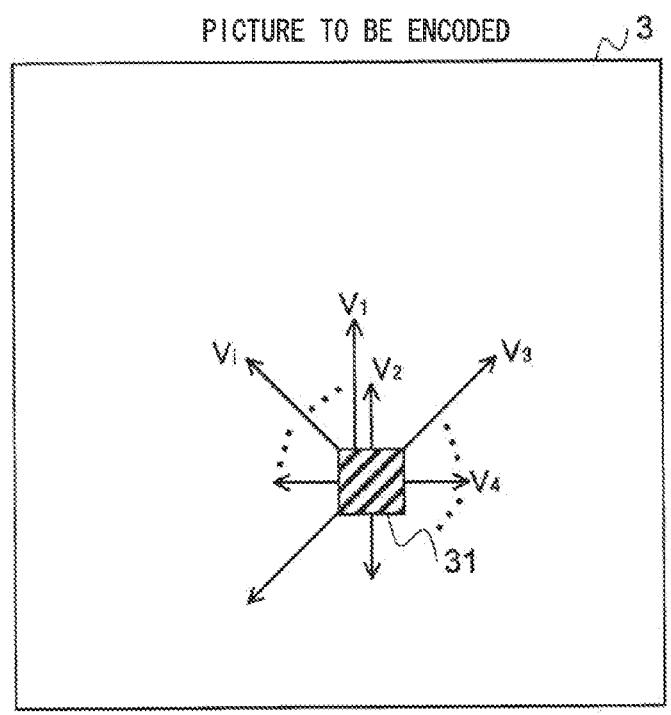
FIG. 6A is a diagram illustrating a first setting example of primary candidate reference motion vectors according to an embodiment of the present invention.

As illustrated in FIG. 6A, the position of a block 31 to be encoded is employed as a reference, and N predetermined motion vectors Vi (i=1, 2, . . . , N) in a predetermined range from the position are used as the primary candidate reference motion vectors. It is possible to arbitrarily determine the values of the motion vectors Vi in advance such that the values are the same in an encoding side and a decoding side. The values of these motion vectors Vi may be stored in a table form in advance.

Furthermore, if a condition that it is possible for the encoding side and the decoding side to use a common value without encoding the values of the motion vectors Vi is satisfied, it is possible to use the values as candidates. Thus, for example, it is also possible to sequentially calculate the statistic of motion vectors of a predetermined number of frames already encoded or decoded in the past, and to select N primary candidate reference motion vectors with high appearance probability from the statistic of the motion vectors.

[Second Setting Example of Primary Candidate Reference Motion Vector]

Figure 6B:
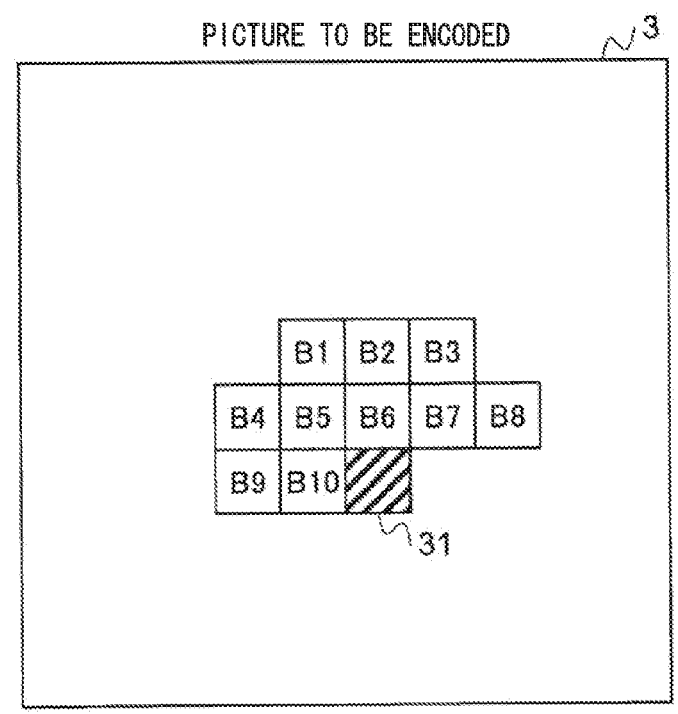
FIG. 6B is a diagram illustrating a second setting example of the primary candidate reference motion vectors according to an embodiment of the present invention.

As illustrated in FIG. 6B, in a picture 3 to be encoded, motion vectors used in encoding a plurality of (10 in this example) coded blocks B1 to B10 around a block 31 to be encoded are set as the primary candidate reference motion vectors. Even in this case, it is possible for the decoding side to set the same motion vectors as primary candidate reference motion vectors used in the encoding side from decoded motion vectors.

[Third Setting Example of Primary Candidate Reference Motion Vector]

After N1 primary candidate reference motion vectors are selected in the above-mentioned first setting example and N2 primary candidate reference motion vectors are selected in the second setting example, the total N (=N1+N2) primary candidate reference motion vectors are set.

[Fourth Setting Example of Primary Candidate Reference Motion Vector]

In the fourth setting example, motion vectors of encoded blocks and motion vectors in a predetermined range with respect to these motion vectors are set as the primary candidate reference motion vectors. For example, when a predetermined range is set as a range of ±1 in the X and Y directions with respect to a motion vector (10, 20) of an encoded block, motion vectors (9, 20), (11, 20), (10, 19), (10, 21), (9, 19), (9, 21), (11, 19), and (11, 21) are employed as candidates, in addition to the motion vector (10, 20). That is, the total 9 primary candidate reference motion vectors are employed as candidates with respect to a motion vector of one encoded block. If the number of motion vectors of an encoded block that are initially employed as candidates is set to K and all motion vectors around the K motion vectors are employed as candidates, (9×K) primary candidate reference motion vectors are used. However, if it is common with a decoding side, all motion vectors around motion vectors of encoded blocks are not employed as candidates, and a part of the motion vectors may be employed as candidates.

As the effect of the above setting, motion vectors around motion vectors of coded blocks are also considered, resulting in the improvement of the efficiency of motion vector prediction.

[Process of Step S2]

The degree of reliability calculation unit 184 (or 255) calculates the degree of reliability of each of the N set primary candidate reference motion vectors set by the primary candidate reference motion vector-setting unit 183 using encoded information. Here, the degrees of reliability quantitatively represent the effectiveness of the primary candidate reference motion vectors in motion vector prediction of the block to be encoded (decoded). The degrees of reliability are calculated for the N primary candidate reference motion vectors using only information already decoded when a decoding side starts decoding a block to be encoded.

Figure 7:
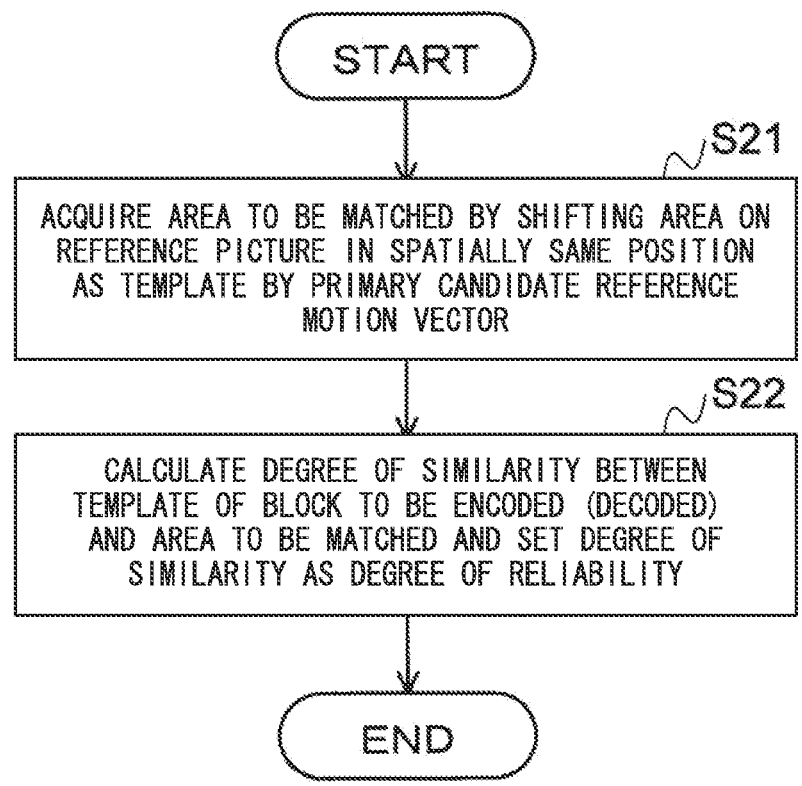
FIG. 7 is a flowchart showing an example of a reliability calculation process according to an embodiment of the present invention.
Figure 8:
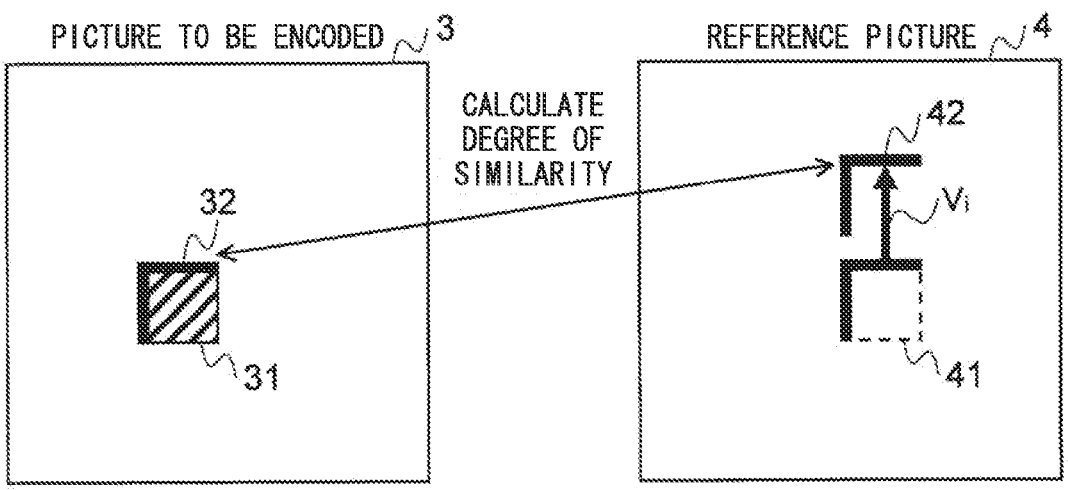
FIG. 8 is a diagram showing a method of calculating a degree of reliability using template matching according to an embodiment of the present invention.

FIG. 7 is a flowchart showing an example of the degree of reliability calculation process, and FIG. 8 is a diagram for explaining how to obtain the degree of reliability using template matching.

As an example of obtaining the degree of reliability, a description will be provided for a method which applies template matching. It is assumed that a predictive motion vector of the block to be encoded 31 is to be obtained in the picture to be encoded 3 in FIG. 8. A template 32 is a set of encoded pixels adjacent to the block 31 to be encoded (in this example, a reverse L-shaped area configured by the group of left and upper pixels of the block 31 to be encoded). It is to be noted that the width (thickness) of the reverse L-shaped area corresponds to, for example, about two pixels; however, it may correspond to one pixel or three pixels or more. A reference picture 4 is an encoded or decoded picture. A corresponding position block 41 in the reference picture 4 is in the same position as that of the block to be encoded 31 in the picture to be encoded 3.

In the degree of reliability calculation process of FIG. 7, in step S21, an area obtained by shifting an area (a reverse L-shaped area adjacent to the corresponding position block 41) on the reference picture 4 in spatially the same position as the template 32 by a primary candidate reference motion vector $V_i$, the degree of reliability of which is to be calculated, is obtained, and this is acquired as an area to be matched 42.

Subsequently, in step S22, the degree of similarity between the template 32 of the block to be encoded 31 and the area to be matched 42 in the reference picture 4 is calculated, and this is set as the degree of reliability of the primary candidate reference motion vector $V_i$.

An example of an index of a degree of similarity is a sum of absolute differences (SAD). The smaller the SAD, the higher the probability that the primary candidate reference motion vector $V_i$ is close to the motion of the block to be encoded 31, and thus it is regarded as a reference motion vector with a high degree of reliability. The index of the degree of reliability used in the degree of reliability calculation unit 184 may be another index indicating the degree of similarity between the template 32 and the area to be matched 42. In addition to the above-mentioned SAD, a sum of squared differences (SSD), a sum of absolute transformed differences (SATD) and the like may be used. All of these are measures indicating that a smaller value thereof means a higher degree of reliability.

Since the template 32 has a high correlation with a picture signal of the block to be encoded 31, if a degree of similarity based thereon is used, it is possible to identify a secondary candidate reference block effective for motion vector prediction.

[Process of Step S3]

Next, the reference motion vector determination unit 185 (or 256) narrows the N primary candidate reference motion vectors down to a small number of secondary candidate reference motion vectors based on degree of reliability information of each primary candidate reference motion vector.

Figure 9A:
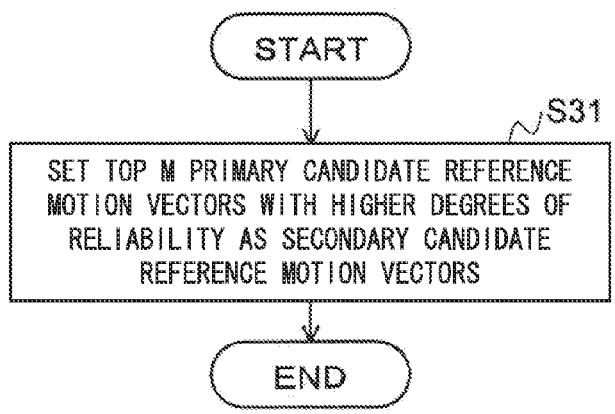
FIG. 9A is a flowchart showing an example of a reference motion vector determination process according to an embodiment of the present invention.

FIG. 9A is a flowchart of a reference motion vector determination process. In step S31, the reference motion vector determination unit 185 arranges the degrees of reliability of the primary candidate reference motion vectors, which have been calculated by the degree of reliability calculation unit 184, in descending order, and sets top M primary candidate reference motion vectors with higher degrees of reliability as secondary candidate reference motion vectors.

Figure 9B:
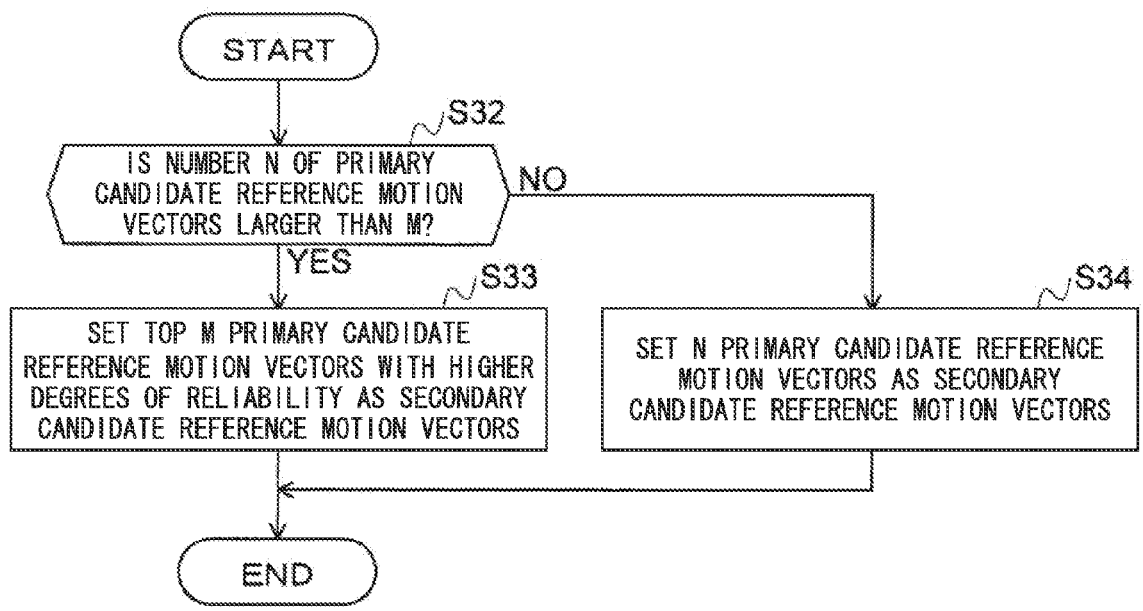
FIG. 9B is a flowchart showing another example of the reference motion vector determination process according to an embodiment of the present invention.

FIG. 9B is a flowchart of another reference motion vector determination process, and illustrates an example of a reference motion vector determination process when considering a case in which the number of primary candidate reference motion vectors does not reach M.

For example, there may be a case in which the number of primary candidate reference motion vectors does not reach the predetermined number M, such as when a great number of intra blocks are included in the primary candidate reference motion vectors. In this case, the secondary candidate reference motion vectors are determined as reference motion vectors as follows.

First, in step S32, it is determined whether or not the number N of the primary candidate reference motion vectors is larger than M. If N is larger than M, the process proceeds to step S33, and top M primary candidate reference motion vectors with higher degrees of reliability are set as secondary candidate reference motion vectors similarly to above-described step S31. If the number N of the primary candidate reference motion vectors actually available is not larger than M, the process proceeds to step S34, and N primary candidate reference motion vectors are set as secondary candidate reference motion vectors.

[Process of Step S4]

Figure 10:
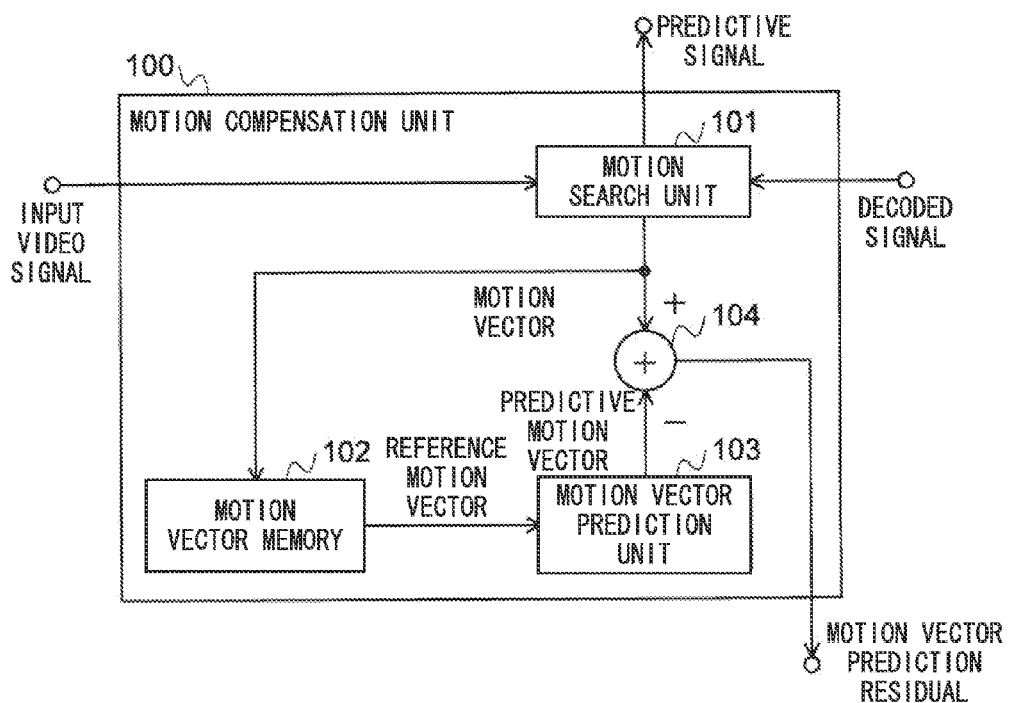
FIG. 10 is a block diagram showing a motion compensation unit in a conventional moving picture encoding apparatus.
Figure 11:
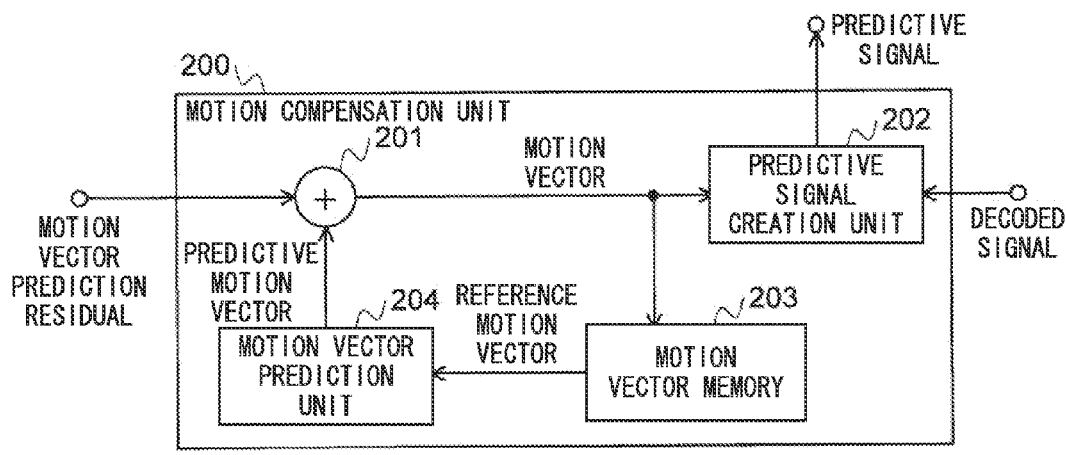
FIG. 11 is a block diagram showing a motion compensation unit in a conventional moving picture decoding apparatus.
Figure 12:
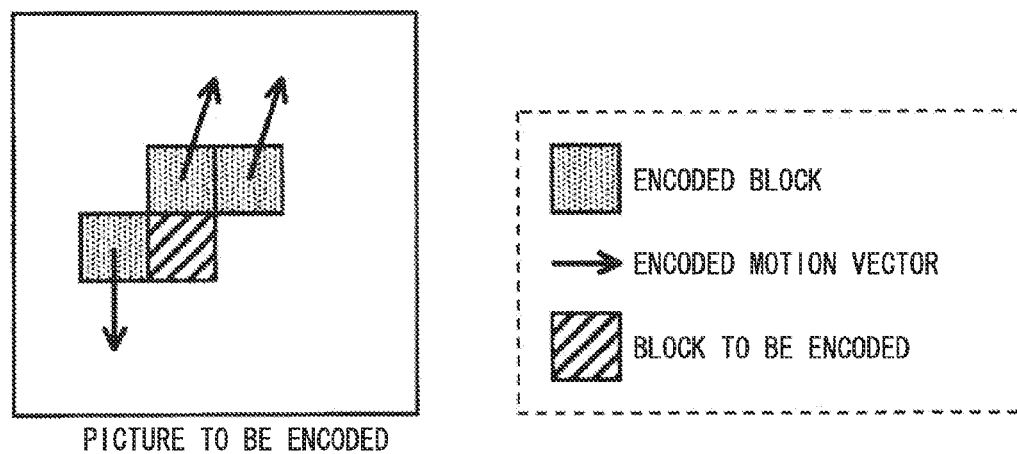
FIG. 12 is a diagram illustrating an example of a conventional prediction encoding scheme of a motion vector.
Figure 13:
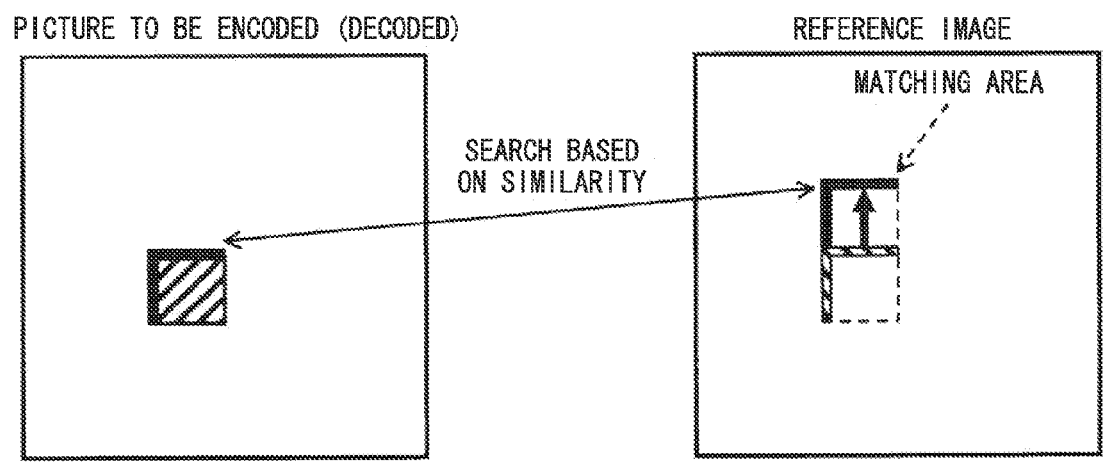
FIG. 13 is a diagram illustrating motion vector prediction based on conventional template matching.
Figure 13:
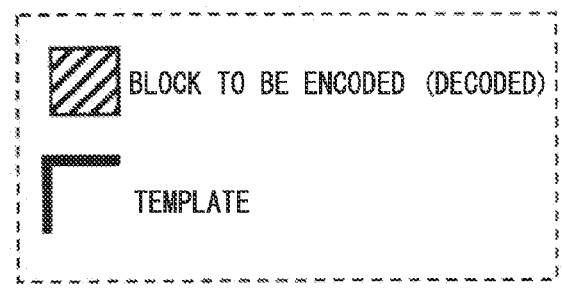
Figure 14:
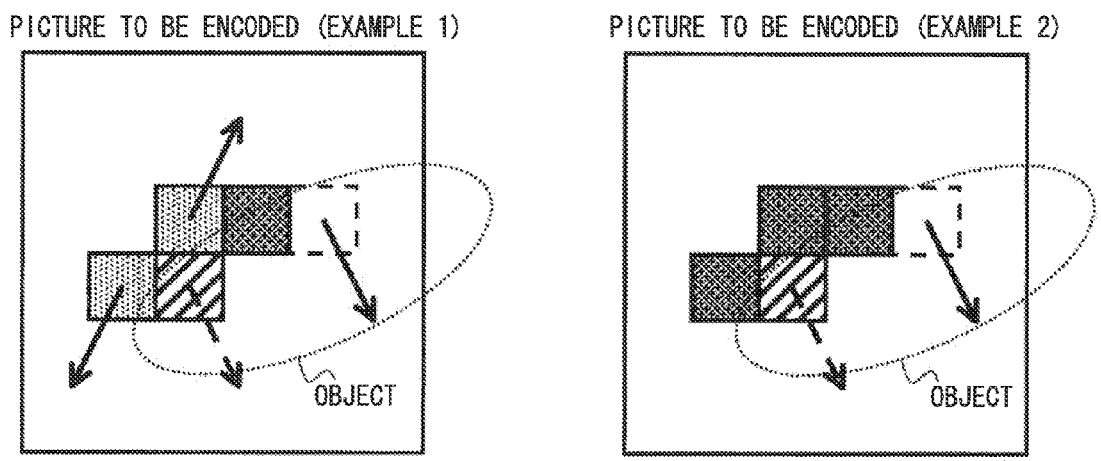
FIG. 14 is a diagram illustrating the problems of a conventional art.
Figure 14:
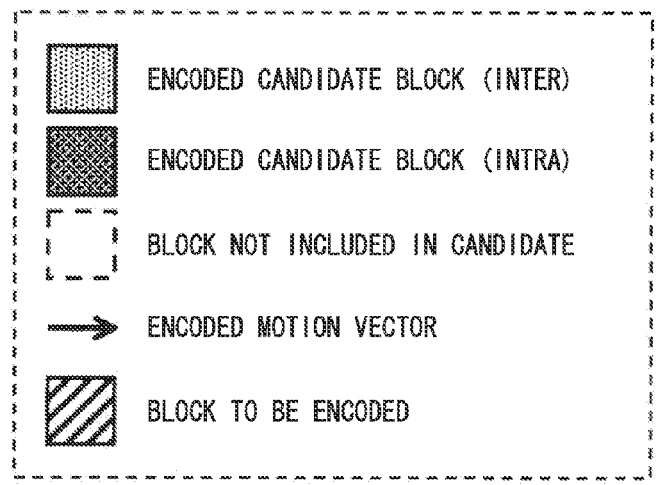

The motion vector prediction unit 186 (or 257) creates a predictive motion vector of the block to be encoded using the secondary candidate reference motion vectors selected by the reference motion vector determination unit 185. A key point of the present embodiment is that a great number of primary candidate reference motion vectors are narrowed down in accordance with the degrees of reliability, thereby obtaining a predictive motion vector for calculating a motion vector prediction residual using secondary candidate reference motion vectors with high degrees of reliability. Thus, the process of obtaining the predictive motion vector from the secondary candidate reference motion vectors may be the same as the process of the motion vector prediction unit 103 (or 204) of the conventional art described with reference to FIG. 10 or FIG. 11. However, the process is not necessarily the same as that in the conventional art, and the predictive motion vector may be obtained using another process, thereby embodying the present invention.

The above-described motion vector prediction encoding process and motion vector prediction decoding process can also be achieved by a computer and a software program. Furthermore, the program can be recorded on a computer-readable recording medium, and it can be provided through a network.

While the embodiments of the present invention have been described with reference to the drawings, detailed configurations are not limited to these embodiments, and the present invention encompasses design or the like (addition, omission, and replacement, and other modifications of the configuration) in a range not departing from the gist of the present invention. The present invention is not to be considered as being limited by the foregoing description, and is only limited by the scope of the appended claims.

INDUSTRIAL APPLICABILITY

The present invention is available in video encoding in which predictive encoding is performed for a motion vector and video decoding technology. According to the present invention, it is possible to improve the efficiency of motion vector prediction, resulting in the improvement of the efficiency of video encoding.

DESCRIPTION OF REFERENCE NUMERALS 1 moving picture encoding apparatus
2 moving picture decoding apparatus
10 prediction residual signal calculation unit
11 orthogonal transformation unit
12 quantization unit
13 information source encoding unit
14, 21 inverse quantization unit
15, 22 inverse orthogonal transformation unit
16 decoded signal calculation unit
17, 24 frame memory
18, 25 motion compensation unit
181 motion search unit
182, 253 motion vector memory
183, 254 primary candidate reference motion vector-setting unit
184, 255 degree of reliability calculation unit
185, 256 reference motion vector determination unit
186, 257 motion vector prediction unit
187 motion vector prediction residual calculation unit
20 information source-decoding unit
23 decoded signal calculation unit
251 motion vector calculation unit
252 predictive signal creation unit

The invention claimed is:

1. A motion vector predictive encoding method in a moving picture encoding scheme in which a picture to be encoded is divided into a plurality of blocks and encoding is performed using motion compensation for each of the blocks, the method comprising:
   a step of performing a motion search for a block to be encoded in the picture to be encoded using an encoded reference picture to calculate a motion vector;
   a step of extracting N (N is an integer equal to or more than 2) motion vectors including motion vectors used in encoding encoded blocks and motion vectors which designate positions within a predetermined range from a position designated by each of the motion vectors used in encoding the encoded blocks or motion vectors having a predetermined value as primary candidate reference motion vectors;
   a step of calculating degrees of reliability of each of the N primary candidate reference motion vectors which quantitatively represent effectiveness in motion vector prediction of the block to be encoded, using a decoded signal of the picture to be encoded for each of the primary candidate reference motion vectors;
   a step of selecting top M (M is a predetermined integer greater than or equal to 1 and less than N) primary candidate reference motion vectors with highest degrees of reliability from the N primary candidate reference motion vectors as secondary candidate reference motion vectors; and
   a step of setting a secondary candidate reference motion vector having a value nearest the motion vector obtained by the motion search among the secondary candidate reference motion vectors as a predictive motion vector of the block to be encoded, encoding an identifier of the set secondary candidate reference motion vector, and encoding a residual between the motion vector obtained through the motion search of the block to be encoded and the predictive motion vector as encoded information of the motion vector,
   wherein the step of calculating degrees of reliability of each of the N primary candidate reference motion vectors using the decoded signal of the picture to be encoded being a different manner from a manner used in the step of setting the secondary candidate reference motion vector as the prediction motion vector of the block to be encoded.

2. The motion vector predictive encoding method according to claim 1, wherein when the number of the highly reliable reference motion vectors is M' that is smaller than M, M' highly reliable reference motion vectors are selected as the secondary candidate reference motion vectors.

3. The motion vector predictive encoding method according to claim 1, wherein, in the step of calculating the degrees of reliability of the primary candidate reference motion vectors, a set of encoded pixels adjacent to the block to be encoded is used as a template, an area obtained by shifting an area of the template by a primary candidate reference motion vector on the reference picture is set as an area to be matched, and a degree of similarity between the set of the encoded pixels of the template and a set of pixels in the area to be matched is calculated as a degree of reliability.

4. The motion vector predictive encoding method according to claim 1, wherein, in the step of selecting the secondary candidate reference motion vectors from the N primary candidate reference motion vectors, a plurality of top primary candidate reference motion vectors with higher degrees of reliability are selected as the secondary candidate reference motion vectors.

5. A motion vector predictive decoding method in a moving picture decoding scheme in which a picture to be decoded of a moving picture being divided into a plurality of blocks and encoded is decoded, using motion compensation for each of the blocks, the method comprising:
a step of decoding a motion vector prediction residual of a block to be decoded;
a step of extracting N (N is an integer equal to or more than 2) motion vectors including motion vectors used in decoding decoded blocks or motion vectors which designate positions within a predetermined range from a position designated by each of the motion vectors used in decoding the decoded blocks or motion vectors having a predetermined value as primary candidate reference motion vectors;
a step of calculating degrees of reliability of each of the N primary candidate reference motion vectors which quantitatively represent effectiveness in motion vector prediction of the block to be decoded, using a decoded signal of the picture to be decoded for each of the primary candidate reference motion vectors;
a step of selecting top M (M is a predetermined integer greater than or equal to 1 and less than N) primary candidate reference motion vectors with highest degrees of reliability from the N primary candidate reference motion vectors as secondary candidate reference motion vectors; and
a step of setting a secondary candidate reference motion vector corresponding to an identifier designated by an encoding end among the secondary candidate reference motion vectors as a predictive motion vector of the block to be decoded, and adding the predictive motion vector to the decoded motion vector prediction residual to calculate a motion vector of the block to be decoded,
wherein the step of calculating degrees of reliability of each of the N primary candidate reference motion vectors using the decoded signal of the picture to be decoded being a different manner from a manner used in the step of setting the secondary candidate reference motion vector as the prediction motion vector of the block to be decoded.

6. The motion vector predictive decoding method according to claim 5, wherein when the number of the highly reliable reference motion vectors is M' that is smaller than M, M' highly reliable reference motion vectors are selected as the secondary candidate reference motion vectors.

7. The motion vector predictive decoding method according to claim 5, wherein, in the step of calculating the degrees of reliability of the primary candidate reference motion vectors, a set of decoded pixels adjacent to the block to be decoded is used as a template, an area obtained by shifting an area of the template by a primary candidate reference motion vector on a decoded reference picture is set as an area to be matched, and a degree of similarity between the set of the decoded pixels of the template and a set of pixels in the area to be matched is calculated as a degrees of reliability.

8. The motion vector predictive decoding method according to claim 5, wherein, in the step of selecting the secondary candidate reference motion vectors from the N primary candidate reference motion vectors, a plurality of top primary candidate reference motion vectors with higher degrees of reliability are selected as the secondary candidate reference motion vectors.

9. A moving picture encoding apparatus which divides a picture to be encoded into a plurality of blocks and encodes a moving picture using motion compensation for each of the blocks, the apparatus comprising:
a motion search processor programmed to perform a motion search for a block to be encoded in the picture to be encoded using an encoded reference picture to calculate a motion vector;
a primary candidate reference motion vector determination processor programmed to extract N (N is an integer equal to or more than 2) motion vectors including motion vectors used in encoding encoded blocks or motion vectors which designate positions within a predetermined range from a position designated by each of the motion vectors used in encoding the encoded blocks or motion vectors having a predetermined value as primary candidate reference motion vectors;
a degree of reliability calculation processor programmed to calculate degrees of reliability of each of the N primary candidate reference motion vectors which quantitatively represent effectiveness in motion vector prediction of the block to be encoded, using a decoded signal of the picture to be encoded for each of the primary candidate reference motion vectors;
a reference motion vector determination processor programmed to select top M (M is a predetermined integer greater than or equal to 1 and less than N) primary candidate reference motion vectors with highest degrees of reliability from the N primary candidate reference motion vectors as secondary candidate reference motion vectors; and
a motion vector encoding processor programmed to set a secondary candidate reference motion vector having a value nearest the motion vector obtained by the motion search among the secondary candidate reference motion vectors as a predictive motion vector of the block to be encoded, programmed to encode an identifier of the set secondary candidate reference motion vector, and programmed to encode a residual between the motion vector obtained through the motion search of the block to be encoded and the predictive motion vector as encoded information of the motion vector,
wherein the degrees of reliability of each of the N primary candidate reference motion vectors calculated using the decoded signal of the picture to be encoded by the degree of reliability calculation processor being calculated in a different manner from a manner used in the motion vector encoding processor to set the secondary candidate reference motion vector as the prediction motion vector of the block to be encoded.

10. The moving picture encoding apparatus according to claim 9, wherein the reference motion vector determination processor is programmed to select a plurality of top primary candidate reference motion vectors with higher degrees of reliability from the N primary candidate reference motion vectors as the secondary candidate reference motion vectors.

11. A moving picture decoding apparatus which decodes a picture to be decoded of a moving picture being divided into a plurality of blocks and encoded, using motion compensation for each of the blocks, the apparatus comprising:

an information source-decoding processor programmed to decode a motion vector prediction residual of a block to be decoded;

a primary candidate reference motion vector determination processor programmed to extract N (N is an integer equal to or more than 2) motion vectors including motion vectors used in decoding decoded blocks or motion vectors which designate positions within a predetermined range from a position designated by each of the motion vectors used in decoding the decoded blocks or motion vectors having a predetermined value as primary candidate reference motion vectors;

a degree of reliability calculation processor programmed to calculate degrees of reliability of each of the N primary candidate reference motion vectors which quantitatively represent effectiveness in motion vector prediction of the block to be decoded, using a decoded signal of the picture to be decoded for each of the primary candidate reference motion vectors;

a reference motion vector determination processor programmed to select top M (M is a predetermined integer greater than or equal to 1 and less than N) primary candidate reference motion vectors with highest degrees of reliability from the N primary candidate reference motion vectors as secondary candidate reference motion vectors; and a motion vector calculation processor programmed to set a secondary candidate reference motion vector corresponding to an identifier designated by an encoding end among the secondary candidate reference motion vectors as a predictive motion vector of the block to be decoded, and programmed to add the predictive motion vector to the decoded motion vector prediction residual to calculate a motion vector of the block to be decoded, wherein the degrees of reliability of each of the N primary candidate reference motion vectors calculated using the decoded signal of the picture to be decoded by the degree of reliability calculation processor being calculated in a different manner from a manner used in the motion vector encoding processor to set the secondary candidate reference motion vector as the prediction motion vector of the block to be decoded.

12. The moving picture decoding apparatus according to claim 11, wherein the reference motion vector determination processor is programmed to select a plurality of top primary candidate reference motion vectors with higher degrees of reliability from the N primary candidate reference motion vectors as the secondary candidate reference motion vectors.

13. A non-transitory computer readable storage medium which stores a motion vector prediction encoding program for allowing a computer to execute the motion vector predictive encoding method according to claim 1.

14. A non-transitory computer readable storage medium which stores a motion vector prediction decoding program for allowing a computer to execute the motion vector predictive decoding method according to claim 5.

* * * * *